US009612510B2

(12) United States Patent
Yanagihara (10) Patent No.: US 9,612,510 B2
(45) Date of Patent: Apr. 4, 2017

(54) PROJECTOR (71) Applicant: Seiko Epson Corporation, Tokyo (JP)

(72) Inventor: Hirokazu Yanagihara, Chino (JP)

(73) Assignee: Seiko Epson Corporation, Tokyo (JP)

(*) Notice: Subject to any disclaimer, the term of this patent is extended or adjusted under 35 U.S.C. 154(b) by 112 days.

(21) Appl. No.: 14/813,033

(22) Filed: Jul. 29, 2015

(65) Prior Publication Data

US 2016/0109788 A1 Apr. 21, 2016

(30) Foreign Application Priority Data

Oct. 21, 2014 (JP) ................................ 2014-214257

(51) Int. Cl.
*G03B 21/16* (2006.01)
*H04N 9/31* (2006.01)
*G03B 21/00* (2006.01)

(52) U.S. Cl.
CPC ........... *G03B 21/16* (2013.01); *G03B 21/005* (2013.01); *H04N 9/3144* (2013.01)

(58) Field of Classification Search
CPC ...... G03B 21/16; G03B 21/14; G03B 21/145; H04N 9/3144; H04N 9/3141
USPC .......... 353/57, 58, 60, 61, 52; 361/688, 689, 361/690, 694, 695
See application file for complete search history.

(56) References Cited

U.S. PATENT DOCUMENTS

| 8,708,502 | B2 | 4/2014 | Matsushita et al. | |
| 2007/0258016 | A1* | 11/2007 | Galligan | G03B 21/16 348/744 |
| 2011/0157560 | A1* | 6/2011 | Hsiao | H04N 9/3144 353/58 |
| 2014/0092368 | A1* | 4/2014 | Dai | G03B 21/16 353/58 |
| 2016/0109787 | A1* | 4/2016 | Yeh | G03B 21/30 353/61 |

FOREIGN PATENT DOCUMENTS

| JP | 2007-248761 A | 9/2007 |
| JP | 2010-130608 A | 6/2010 |

* cited by examiner

*Primary Examiner* — William C Dowling
*Assistant Examiner* — Ryan Howard
(74) *Attorney, Agent, or Firm* — ALG Intellectual Property, LLC (57) ABSTRACT

A projector includes an optical unit having a light modulator and a projection lens, a control section, an exterior enclosure that accommodates the optical unit and the control section, a partitioning section that partitions the interior of the exterior enclosure into a first region where the optical unit is disposed and a second region where the control section is disposed, an intake fan and another intake fan that takes air outside the exterior enclosure into the interior thereof and causes the taken-in air to flow through the first region and the second region, respectively, an aggregation substrate disposed in the first region and having a wiring line that originates from at least a light modulator that are controlled by the control section and is electrically connected to the control section, and a wiring section that electrically connects the control section and the aggregation substrate to each other.

9 Claims, 4 Drawing Sheets

PROJECTOR

BACKGROUND

1. Technical Field

The present invention relates to a projector.

2. Related Art

There is a known projector of related art that modulates light emitted from a light source in accordance with image information and projects the modulated light on a screen or any other surface. The projector includes not only the light source and a light modulator that modulates the light emitted from the light source but also a control section that controls the light modulator, a power supply apparatus that supplies the light source and the control section with electric power, and other components. Since the light source and the power supply apparatus generate heat, a projector intended to suppress the amount of the heat transferred to the control section and other components or a heat load acting thereon has been proposed (see JP-A-2007-248761, for example).

The projector described in JP-A-2007-248761 includes a projection section, a projection section fixing member, an exterior case, a metal plate, a power supply substrate, a control substrate, and first and second fans.

The projection section includes a lamp, a lens, and other components and projects an image on a screen. The projection section fixing member has a first space that accommodates the projection section. The metal plate partitions a second space which is the outside of the projection section fixing member in the exterior case into an upper space and a lower space. The power supply substrate is disposed in the upper space, and the control substrate is disposed in the lower space. The exterior case is provided with an air intake port for the first space and an air intake port for the second space.

The first fan, which is disposed in the vicinity of the lamp, causes outside air taken in through the air intake port for the first space to flow through the first space to cool the lamp and discharges the air out of the exterior case. The second fan causes outside air taken in through the air intake port for the second space to flow through the upper and lower spaces of the second space to cool the power supply substrate and the control substrate and discharges the air out of the exterior case.

The technology described in JP-A-2007-248761, however, has a difficulty in sufficiently cooling the projection section and causes another concern about degradation in a projected image due to entry of dust outside the projector into the projection section. That is, although not disclosed in JP-A-2007-248761, in the light of a known technology, the projection section includes optical elements for projecting an image (for example, a light modulator that modulates light emitted from the lamp, a light conversion element, and a lens). These optical elements generate heat when they are irradiated with the light from the lamp and therefore need to be cooled, but it is believed that it is difficult for only the first fan disposed in the vicinity of the lamp to cool the optical elements. Further, to control the light modulator and the first fan, these members need to be electrically connected to the control substrate, and the projection section fixing member is therefore provided with an opening through which cables and other components for the electrical connection are inserted. Further, it is conceivable that the opening is provided at a plurality of locations when fans for cooling the optical elements and other components are provided in addition to the first fan. As a result, outside air taken in through the air intake port for the second space tends to flow through the openings into the first space. In the light of a known technology, a dust filter is provided in the air intake port for the first space and prevents outside dust from passing through the air intake port for the first space, but since no dust filter is provided in the air intake port for the second space, outside dust undesirably enters the first space.

As described above, the projector described in JP-A-2007-248761 undesirably has a difficulty insufficiently cooling the projection section and tends to allow dust to enter the region where the projection section is disposed.

SUMMARY

An advantage of some aspects of the invention is to solve at least a part of the problems described above, and the invention can be implemented as the following forms or application examples.

APPLICATION EXAMPLE 1

A projector according to this application example includes an optical unit having a light modulator that modulates light emitted from a light source and a projection lens that projects light modulated by the light modulator, a control section that controls action of the projector, an exterior enclosure that accommodates the optical unit and the control section, a partitioning section that partitions the interior of the exterior enclosure into a first region where the optical unit is disposed and a second region where the control section is disposed, a fan that takes air outside the exterior enclosure into interior thereof and causes the taken-in air to flow through the first region and the second region, an aggregation substrate disposed in the first region and having a wiring line that originates from at least the light modulator among components that are controlled by the control section and disposed in the first region and is electrically connected to the control section, and a wiring section that electrically connects the control section and the aggregation substrate to each other.

According to the configuration described above, the interior of the exterior enclosure is partitioned by the partitioning section into the first region where the optical unit is disposed and the second region where the control section is disposed, and air flows through both the first region and the second region. The aggregation substrate, which has wiring lines that electrically connect the light modulator to the control section, is disposed in the first region, and the aggregation substrate and the control section are connected to each other via the wiring section.

In this configuration, providing the aggregation substrate with the wiring lines that connect an input terminal of the light modulator to the control section allows the aggregation substrate to put together the plurality of wiring lines connected to the input terminal of the light modulator and connect them to the control section via the wiring section. The connection to the control section can therefore be more compact than in a configuration in which the input terminal of the light modulator is directly connected to the control section, whereby the opening which is formed in the partitioning section and through which the wiring section is inserted is reduced in size. The small opening can suppress the air flow between the first region and the second region, and the suppressed amount of air flow achieves improvement in anti-dust performance of the first region and efficient cooling thereof as well as reduction in anti-dust performance of the second region as compared with that of the first region for increased ventilation performance. The following items are therefore possible: prevention of adhesion of dust to the optical parts in the optical unit disposed in the first region and efficient cooling of the optical parts; and efficient cooling of the control section disposed in the second region. The projector can therefore project an image with suppression of image quality degradation due to dust adhering to the optical parts and high temperature thereof and achieve noise reduction, for example, by low-voltage operation of the fan. In particular, in the configuration of an optical unit having a plurality of light modulators provided therein, in which the input terminals of the light modulators are disposed in different positions and the number of wiring lines increases, a remarkable effect is provided.

APPLICATION EXAMPLE 2

In the projector according to the application example described above, it is preferable that the fan includes a first fan that is disposed in the first region and causes air to flow through the first region and a second fan that is disposed in the second region and causes air to flow through the second region, and that the aggregation substrate has a wiring line originating from the first fan and electrically connected to the control section.

According to the configuration described above, in which the first fan is disposed in the first region and the second fan is disposed in the second region, the amounts and speeds of the air caused to flow through the first region and the second region can be readily controlled. Since the wiring line that connects the first fan to the control section is provided in the aggregation substrate, the aggregation substrate can put together the wiring lines from the light modulator and the first fan, and the light modulator and the first fan can be electrically connected to the control section via the wiring section. The members disposed in the first region and the second region can be more efficiently cooled with the anti-dust performance of the first region increased.

APPLICATION EXAMPLE 3

It is preferable that the projector according to the application example described above further includes a power supply apparatus that supplies the control section and the light source with electric power, and the power supply apparatus includes a filter section that removes noise in externally supplied AC current, a power supply section that converts AC electric power outputted from the filter section into DC electric power, and a light source drive section that transforms the DC electric power outputted from the power supply section to drive the light source, and that at least the power supply section in the power supply apparatus is disposed in the second region.

According to the configuration described above, since the power supply section is disposed in the second region, which has higher ventilation performance, the power supply section can be more efficiently cooled.

APPLICATION EXAMPLE 4

In the projector according to the application example described above, it is preferable that the power supply section is disposed in a position downstream of the control section in a direction in which the air flows through the second region.

According to the configuration described above, the control section and the power supply section are arranged side by side in this order in the direction in which the air flows through the second region, and the air flowing through the second region cools the control section and then cools the power supply section, which is heated to a temperature higher than the temperature of the control section. The projector provided by the application example therefore has a reduced size in a direction that intersects the direction in which the control section and the power supply section are arranged side by side and allows the power supply section to be cooled by effectively using the air having cooled the control section.

APPLICATION EXAMPLE 5

In the projector according to the application example described above, it is preferable that the control section has a control substrate on which a control circuit device is implemented, and that the wiring section has a wiring line that electrically connects the control substrate to the aggregation substrate and is part of a circuit substrate formed of the control substrate and the aggregation substrate integrated with each other.

According to the configuration described above, no cable, connector, or other components for electrically connecting the control substrate to the aggregation substrate are required, whereby the number of parts can be reduced and the manufacturing procedure can be simplified.

APPLICATION EXAMPLE 6

In the projector according to the application example described above, it is preferable that the partitioning section partitions the interior of the exterior enclosure in such a way that the first region and the second region are arranged side by side in a direction that intersects a vertical direction in an installation attitude of the projector.

According to the configuration described above, since the optical unit disposed in the first region and the control section disposed in the second region are arranged side by side in the direction described above, heat transfer from one side to the other side is more unlikely to occur than in a configuration in which the optical unit and the control section are arranged side by side in the upward/downward direction. The optical unit and the control section can therefore be efficiently cooled.

APPLICATION EXAMPLE 7

In the projector according to the application example described above, it is preferable that the control section includes an interface substrate on which a connection terminal to which an external apparatus is connected is implemented, and that a terminal opening that exposes the connection terminal is formed in the exterior enclosure.

According to the configuration described above, the interface substrate is disposed in the second region. Therefore, even when outside dust enters the second region through the terminal opening of the exterior enclosure, the partitioning section prevents the dust from entering the first region. Dust is therefore more unlikely to adhere to the optical parts in the optical unit disposed in the first region, and the projector can project an image with suppression of image quality degradation due to the dust adhesion.

APPLICATION EXAMPLE 8

In the projector according to the application example described above, it is preferable that the interface substrate is so disposed that a surface facing away from the surface on which the connection terminal is implemented faces a lateral side of the projection lens, and that the fan that causes air to flow through the second region is so disposed that the fan delivers the air in a direction along the interface substrate.

The term "lateral side" of the projection lens used herein is the left side or the right side of the projection lens when the projector in an attitude in which the projector is installed on a desk or any other surface is viewed from a back side provided that the projection surface side of the projector is called a front side.

According to the configuration described above, the connection terminal can be disposed on the side facing a side surface of the projector that corresponds to the lateral side of the projection lens, and the cooling air can be caused to flow through the second region with increased fluidity therein, whereby the members disposed in the second region can be efficiently cooled.

APPLICATION EXAMPLE 9

In the projector according to the application example described above, it is preferable that the exterior enclosure has a discharge port through which the air having flowed through the first region and the air having flowed through the second region are discharged in the same direction.

According to the configuration described above, since the air having cooled the members disposed in the first region and the air having cooled the members disposed in the second region are discharged in the same direction, occurrence of multidirectional flow of the discharged air is suppressed. As a result, the projector allows a viewer who feels discomfort due to the discharged air to be present in a wider area in the vicinity of the projector than in a configuration in which the air having cooled the interior of the projector is discharged in a plurality of directions, whereby the projector provided by this application example allows the viewer to more flexibly select the observation position.

Further, since the first discharge port can be so formed that it is unlikely to be visible from multiple positions outside the projector, whereby the exterior appearance of the projector can be improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

A projector according to an embodiment of the invention will be described below with reference to the drawings.

The projector according to the present embodiment modulates light emitted from a light source in accordance with image information and enlarges and projects the modulated light on a screen or any other projection surface.

Figure 1:
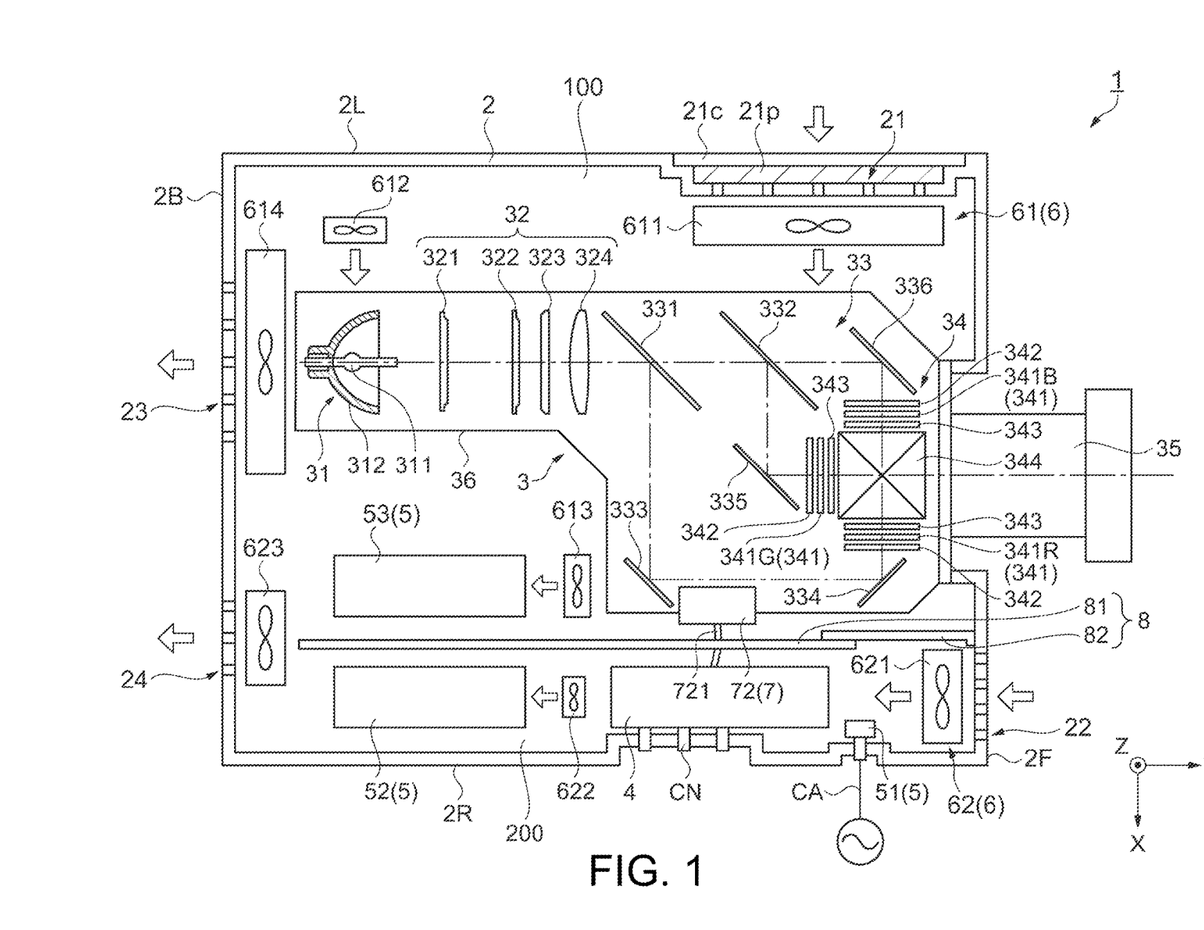
FIG. 1 is a diagrammatic view showing a schematic configuration of a projector according to an embodiment of the invention.

FIG. 1 is a diagrammatic view showing a primary configuration of a projector 1 according to the present embodiment.

Figure 3:
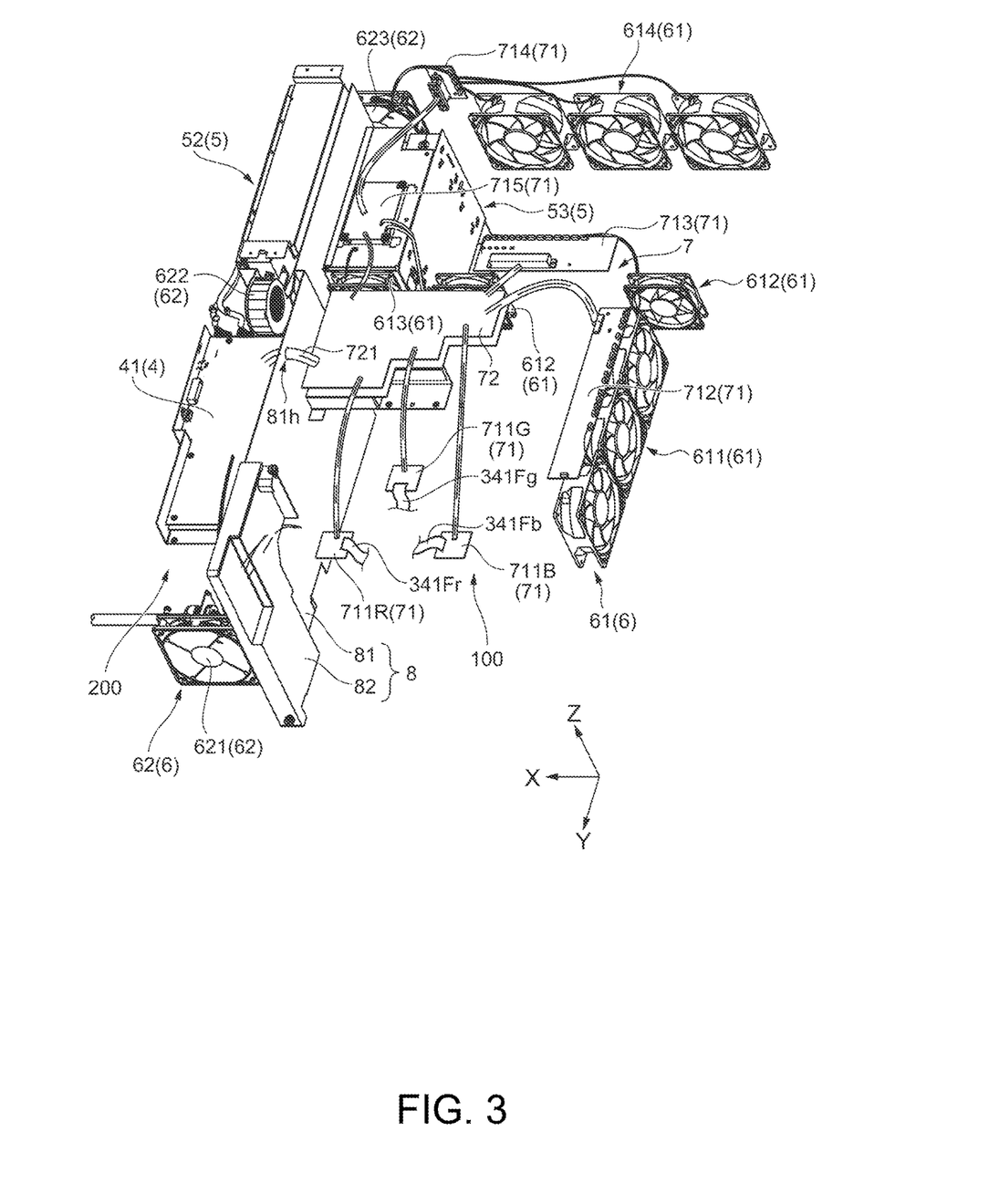
FIG. 3 is a perspective view of the control section, the power supply apparatus, the cooling apparatus, the circuit connection section, and the partitioning section in the present embodiment viewed from the side where a first region is present.

The projector 1 includes an exterior enclosure 2, which forms the exterior of the projector 1, an optical unit 3, which includes a light source apparatus 31, a control section 4, a power supply apparatus 5, which supplies the light source apparatus 31, the control section 4, and other portions with electric power, a cooling apparatus 6, which has a plurality of fans, s circuit connection section 7, and a partitioning section 8, which partitions the interior of the exterior enclosure 2 into a first region 100 and a second region 200, as shown in FIG. 1.

In FIG. 1, to clearly show the primary parts of the projector 1, a plurality of fans having the same function are drawn in the form of a single fan, and relay substrates 71 (see FIG. 3), which will be described later, in the circuit connection section 7 are omitted. Further, in the following description, the direction in which light is outputted from the projector 1 is called frontward (+Y direction); the upper side of the projector 1 installed on a desk or any other surface is called upward (+Z direction); and the right side of the projector 1 when viewed from the back side is called rightward (+X direction) for ease of description.

The exterior enclosure 2, although not illustrated in detail, is formed of a plurality of members and has an upper surface and a bottom surface (neither of them is shown) and a front surface 2F, a right side surface 2R, a left side surface 2L, and a back surface 2B, as shown in FIG. 1. A first intake port 21 for taking outside air in is formed in the left side surface 2L, and a second intake port 22 for taking outside air in is formed in the front surface 2F and in a position shifted toward the right side surface 2R.

A dust filter 21p, which prevents dust present in the outside air from entering the exterior enclosure 2, and a cover 21c, which fixes the dust filter 21p and is removed when the dust filter 21p is exchanged, are disposed in the first intake port 21.

A first discharge port 23 is formed in the back surface 2B of the exterior enclosure 2 and in a position shifted toward the left side surface 2L, and a second discharge port 24 is formed in the back surface 2B and in a position shifted toward the right side surface 2R. A terminal opening through which a connection terminal CN is exposed is formed in the right side surface 2R.

The projector 1 is so configured that it can take not only a horizontal attitude in which a horizontally long image is projected but also a vertical attitude which is an attitude rotated by 90° from the horizontal attitude and in which a vertically long image is projected. Although will be described later in detail, the optical unit 3 and the control section 4 are arranged side by side in a direction that intersects the vertical direction, specifically, in the rightward/leftward direction (±X directions) in an installation attitude of the projector 1 in which it takes the horizontal attitude, as shown in FIG. 1.

The partitioning section 8 is disposed between the optical unit 3 and the control section 4 and partitions the interior of the exterior enclosure 2 into the first region 100, where the optical unit 3 is disposed, and the second region 200, where the control section 4 is disposed. The first intake port 21 is an opening through which outside air flows into the first region 100, and the second intake port 22 is an opening through which outside air flows into the second region 200.

The optical unit 3 optically processes light outputted from the light source apparatus 31 and projects the processed light under the control of the control section 4.

The optical unit 3 includes not only the light source apparatus 31 but also an optical integration illumination system 32, a color separation system 33, an optical apparatus 34, which has a light modulator that will be described later, a projection lens 35, and an optical part enclosure 36, in which the optical parts described above are disposed in predetermined positions along the optical path, as shown in FIG. 1.

The light source apparatus 31 includes a discharge-type light source 311, which is formed, for example, of an ultrahigh-pressure mercury lamp or a metal halide lamp, and a reflector 312. In the light source apparatus 31, the reflector 312 reflects light emitted from the light source 311 and directs the reflected light toward the optical integration illumination system 32.

The optical integration illumination system 32 includes a first lens array 321, a second lens array 322, a polarization conversion element 323, and a superimposing lens 324.

The first lens array 321 has a configuration in which lenslets are arranged in a matrix and divides the light outputted from the light source apparatus 31 into a plurality of sub-light fluxes. The second lens array 322 has roughly the same configuration as that of the first lens array 321 and roughly superimposes, along with the superimposing lens 324, the sub-light fluxes on the surface of the light modulator. The polarization conversion element 323 has a function of aligning the polarization directions of randomly polarized light fluxes having exited out of the second lens array 322 with one another to form substantially one type of polarized light that the light modulator can use.

The color separation system 33 includes dichroic mirrors 331 and 332 and reflection mirrors 333 to 336 and has a function of separating the light having exited out of the optical integration illumination system 32 into the following three color light fluxes: red light (hereinafter referred to as "R light"); green light (hereinafter referred to as "G light"); and blue light (hereinafter referred to as "B light") and guiding them to the light modulator.

The optical apparatus 35 includes three liquid crystal panels 341 provided as the light modulator for the three color light fluxes (reference character 341R denotes liquid crystal panel for R light, reference character 341G denotes liquid crystal panel for G light, and reference character 341B denotes liquid crystal panel for B light), a light-incident-side polarizer 342 disposed on the light incident side of each of the liquid crystal panels 341, a light-exiting-side polarizer 343 disposed on the light exiting side of each of the liquid crystal panels 341, and a cross dichroic prism 344 as a light combining optical apparatus.

Each of the liquid crystal panels 341 is of a transmissive type, includes a liquid crystal material sealed and encapsulated between a device substrate made, for example, of glass and a counter substrate so disposed that it faces the device substrate, and has a rectangular pixel region in which minute pixels are formed in a matrix. A flexible substrate 341F for electrical connection to the control section 4 (see FIG. 3, reference character 341Fr denotes flexible substrate 341F for liquid crystal panel 341R, reference character 341Fg denotes flexible substrate 341F for liquid crystal panel 341G, and reference character 341Fb denotes flexible substrate 341F for liquid crystal panel 341B) is connected to the device substrate.

Each of the flexible substrates 341F has an input terminal, and a drive signal according to image information is inputted from the control section 4 to the corresponding liquid crystal panel via the corresponding flexible substrate 341. The drive signal controls the orientation of the liquid crystal material in the pixel region of the liquid crystal panel to modulate the color light flux incident thereon.

The cross dichroic prism 344 is formed by bonding four rectangular prisms and hence has a roughly square shape in a plan view, and two dielectric multilayer films are formed on the interfaces between the bonded rectangular prisms. The cross dichroic prism 344, in which the dielectric multilayer films reflect the R light and the B light modulated by the light modulators 341R and 341B and transmit the G light modulated by the light modulator 341G, combines the three modulated color light fluxes with one another.

The projection lens 35 includes a plurality of lenses and enlarges and projects the combined light from the cross dichroic prism 344 on the screen.

The control section 4 is disposed on the right side of the optical unit 3 (in a position shifted therefrom in +X direction) as shown in FIG. 1, has a function as a computer, and controls action of the projector 1, for example, performs control associated with image projection, control of drive operation of the fans provided in the cooling apparatus 6, and other types of control.

Figure 2:
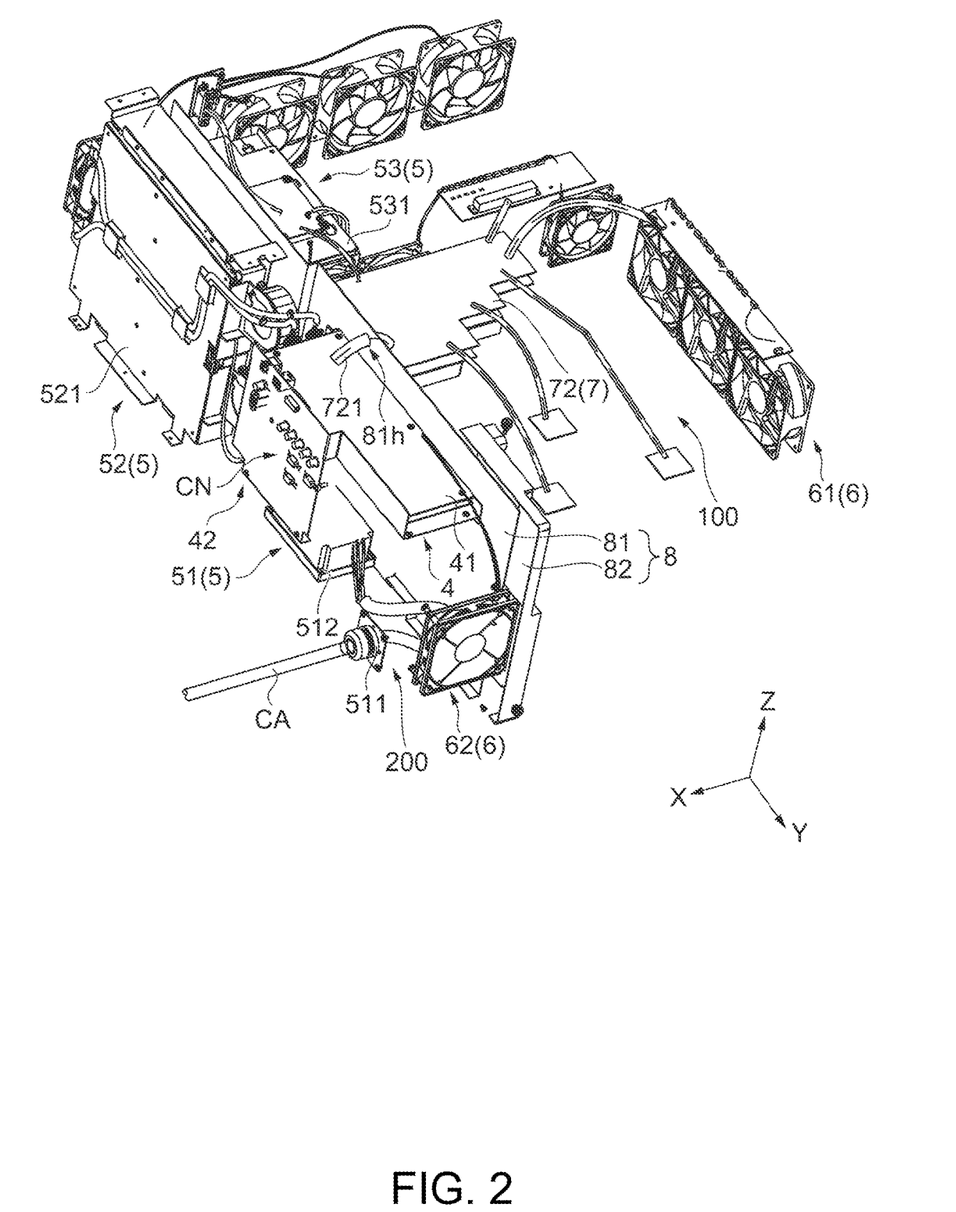
FIG. 2 is a perspective view of a control section, a power supply apparatus, a cooling apparatus, a circuit connection section, and a partitioning section in the present embodiment viewed from the side where a second region is present.

FIG. 2 is a perspective view of the control section 4, the power supply apparatus 5, the cooling apparatus 6, the circuit connection section 7, and the partitioning section 8 viewed from the side where the second region is present.

The control section 4 includes a CPU (central processing unit), a ROM (read only memory), and a RAM (random access memory) (neither of them is shown), a control substrate 41, on which the control circuit devices described above are implemented, and an interface section 42, as shown in FIG. 2.

The control substrate 41 is so disposed that the implementation surface thereof roughly extends in an X-Y plane.

The interface section 42 includes a connection terminal CN, to which an external apparatus (such as computer and video player) is connected, and an interface substrate (not shown) on which the connection terminal CN is implemented. The connection terminal CN is, for example, a terminal to which an image signal, a voice signal, and other signals from the external apparatus can be inputted (such as terminal that complies with HDMI (registered trademark) standard, video terminal, and audio terminal).

The interface substrate is connected to the control substrate 41 via a connector (not shown) in such a way that the implementation surface of the interface substrate roughly extend in a Y-Z plane. Further, the interface substrate is so disposed that the surface facing away from the surface on which the connection terminal CN is implemented faces the right side of the projection lens 35. The connection terminal CN is exposed through the right side surface 2R of the exterior enclosure 2 (see FIG. 1), as described above.

The power supply apparatus 5 electrically converts electric power externally supplied through a power supply cable CA and supplies the control section 4, the light source 311, and other portions with the converted electric power.

The power supply apparatus 5 includes a filter section 51, a power supply section 52, and a light source drive section 53, with the filter section 51 and the power supply section 52 disposed in the second region 200 and the light source drive section 53 disposed in the first region 100, as shown in FIG. 2.

The filter section 51 is disposed below the control section 4 and includes an inlet connector 511, to which the power supply cable CA is connected, a circuit device that removes noise produced by AC electric power inputted through the inlet connector 511, and a filter substrate 512, on which the circuit device is implemented.

The inlet connector 511 is so disposed that an insertion port thereof is exposed through the right side surface 2R of the exterior enclosure 2 (see FIG. 1). The filter substrate 512 is disposed behind the inlet connector 511 (in a position shifted therefrom in −Y direction).

The power supply section 52 is disposed behind the control section 4 and the filter section 51, as shown in FIG. 2, and connected to the filter section 51. The power supply section 52 includes a power supply circuit substrate on which a coil, a transistor, a diode, and other circuit devices are implemented, a heat sink, and a shield member 521, which covers the members described above in the upward/downward and rightward/leftward directions but opens in the frontward/backward direction. The power supply section 52 rectifies the AC electric power outputted from the filter section 51, converts the rectified electric power into DC electric power having a variety of voltage values, and outputs the converted electric power to the light source drive section 53, the control section 4, and other portions. The power supply section 52 is so disposed that the power supply circuit substrate extends in the frontward/backward direction (±Y directions).

The light source drive section 53 is disposed on the left side of the power supply section 52 (in a position shifted therefrom in the −X direction), as shown in FIG. 2, and connected to the power supply section 52. The light source drive section 53 includes a light source drive circuit substrate on which a coil, a transistor, and other circuit devices for producing AC rectangular-wave current are implemented, a heat sink for dissipating heat generated by the transistor and other components, and a shield member 531, which covers the members described above in the upward/downward and rightward/leftward directions but opens in the frontward/backward direction. The light source drive section 53 rectifies and transforms the DC current supplied from the power supply section 52 to produce AC rectangular-wave current, which drives the light source 311. The light source drive section 53 is so disposed that the light source drive circuit substrate extends in the frontward/backward direction (±Y directions). A cable (not shown) that connects the power supply section 52 and the light source drive section 53 to each other is so wired that it passes by a portion in the vicinity of a discharge fan 623.

FIG. 3 is a perspective view of the control section 4, the power supply apparatus 5, the cooling apparatus 6, the circuit connection section 7, and the partitioning section 8 viewed from the side where the first region 100 is present.

The cooling apparatus 6 includes a first cooling apparatus 61 and a second cooling apparatus 62, as shown in FIG. 3.

The first cooling apparatus 61 includes three intake fans 611, two lamp fans 612, a power supply fan 613, and three discharge fans 614 and is disposed in the first region 100. In the first cooling apparatus 61, the fans therein are driven based on instructions from the control section 4 and primarily cool the optical unit 3 and the light source drive section 53. The intake fans 611 correspond to a first fan. The numbers of intake fans 611, lamp fan 612, and discharge fans 614 are not limited to those described above and may be any other numbers.

Each of the intake fans 611 is an axial fan. The three intake fans 611 are disposed inside the first intake port 21 (see FIG. 1) and along the frontward/backward direction and takes in the air outside the exterior enclosure 2 through the first intake port 21.

Each of the lamp fans 612 is an axial fan and so disposed that it delivers air toward the light source apparatus 31.

The power supply fan 613 is an axial fan and disposed in front of the light source drive section 53 so that it delivers air toward the light source drive section 53.

Each of the discharge fans 614 is an axial fan, is disposed between the light source apparatus 31 and the first discharge port 23 (see FIG. 1) and along the rightward/leftward direction, and discharges air inside the exterior enclosure 2 through the first discharge port 23.

The second cooling apparatus 62 includes an intake fan 621, a power supply fan 622, and a discharge fan 623 as a second fan, and these fans are driven based on instructions from the control section 4 and primarily cool the control section 4, the filter section 51, and the power supply section 52.

The intake fan 621 is an axial fan, is disposed inside the second intake port 22 (see FIG. 1) and in the second region 200, and takes in the air outside the exterior enclosure 2 through the second intake port 22. The intake fan 621 is so disposed that it delivers air in the direction along the control substrate 41 and the interface substrate.

The power supply fan 622 is a sirocco fan, disposed in the second region 200, and further so disposed in front of the power supply section 52 that an intake port of the power supply fan 622 through which air is taken in is oriented leftward (in −X direction) and a discharge port thereof through which the taken-in air is discharged faces the power supply section 52.

The discharge fan 623 is an axial fan, is disposed between the power supply section 52/the light source drive section 53 and the second discharge port 24 (see FIG. 1), and discharges air in the exterior enclosure 2 through the second discharge port 24. The discharge fan 623 has a rightward/leftward size smaller than the size of a region where the power supply section 52 and the light source drive section 53 are disposed and is disposed behind the power supply section 52 and the light source drive section 53, that is, so disposed that the discharge fan 623 overlaps with the first region 100 and the second region 200.

The circuit connection section 7 includes a plurality of relay substrates 71, an aggregation substrate 72, and a plurality of cables, which are disposed in the first region 100, and a wiring section 721, which is so disposed that it extends both in the first region 100 and the second region 200, as shown in FIG. 3. The circuit connection section 7 electrically connects the liquid crystal panels 341, the fans provided in the first cooling apparatus 61, and the discharge fan 623 in the second cooling apparatus 62 to the control substrate 41.

Specifically, the relay substrates 71 are formed of first relay substrates 711R, 711G, and 711B, a second relay substrate 712, a third relay substrate 713, a fourth relay substrate 714, and a fifth relay substrate 715.

The first relay substrate 711R, 711G, and 711B are, although not illustrated in detail, located above the optical apparatus 34 and fixed to the upper surface of the optical part enclosure 36. The first relay substrate 711R, 711G, and 711B are so formed that they are connected to the liquid crystal panels 341 for the respective color light fluxes. Specifically, the flexible substrate 341Fr is connected to the first relay substrate 711R, the flexible substrate 341Fg is connected to the first relay substrate 711G, and the flexible substrate 341Fb is connected to the first relay substrate 711B. In the first relay substrate 711R, 711G, and 711B are formed wiring lines connected to input terminals of the flexible substrates 341Fr, 341Fg, and 341Fb.

The second relay substrate 712 is disposed above the intake fans 611. Cables from the three intake fans 611 are connected to the second relay substrate 712, and wiring lines connected to the cables are formed in the second relay substrate 712.

The third relay substrate 713 is disposed above the lamp fans 612. Cables from the two lamp fans 612 are connected to the third relay substrate 713, and wiring lines connected to the cables are formed in the third relay substrate 713.

The fourth relay substrate 714 is disposed between the discharge fans 614 and the discharge fan 623. Cables from the three discharge fans 614 and the discharge fan 623 are connected to the fourth relay substrate 714, and wiring lines connected to the cables are formed in the fourth relay substrate 714.

The fifth relay substrate 715 is disposed above the light source drive section 53. The fifth relay substrate 715 is connected to the fourth relay substrate 714 via a cable. A cable from the power supply fan 613 is connected to the fifth relay substrate 715, and a wiring line connected to the cable is formed in the fifth relay substrate 715. Cables from the intake fan 621 and the power supply fan 622 in the second cooling apparatus 62 are connected to the control substrate 41.

The aggregation substrate 72 is disposed on the left side of the control section 4 (in a position shifted therefrom in the −X direction) and in front of the light source drive section 53. The aggregation substrate 72 has a function of aggregating wiring lines electrically connected to the control section 4 and has wiring lines leading not only to the liquid crystal panels 341 and the fans provided in the first cooling apparatus 61 among the components disposed in the first region 100 and controlled by the control section 4 but also to the discharge fan 623 in the second cooling apparatus 62. Specifically, the aggregation substrate 72 is connected to the first relay substrates 711R, 711G, and 711B, the second relay substrate 712, the third relay substrate 713, and the fifth relay substrate 715 via cables, and wiring lines connected to the cables are formed in the aggregation substrate 72.

The wiring section 71 is formed of bundled cables connected to the wiring lines aggregated by the aggregation substrate 72 and electrically connects the control substrate 41 and the aggregation substrate 72 to each other. Further, at least one of the opposite ends of the wiring section 71 is connected to the control substrate 41 or the aggregation substrate 72 via a connector (not shown).

The liquid crystal panels 341, the intake fans 611, the lamp fans 612, the power supply fan 613, and the discharge fans 614 and 623 thus receive control signals as inputs from the control section 4 via the circuit connection section 7.

The partitioning section 8 is disposed between the optical unit 3 and the control section 4 and partitions the interior of the exterior enclosure 2 into the first region 100, where the optical unit 3 is disposed, and the second region 200, where the control section 4 is disposed, as described above, to suppress fluidity of the air that flows between the first region 100 and the second region 200.

The partitioning section 8 has a first partitioning member 81 and a second partitioning member 82, each of which is formed of a plate-shaped member. The first partitioning member 81 extends in the upward/downward direction and the frontward/backward direction. Specifically, the partitioning member 81 extends in the upward/downward direction in such a way that it is substantially in contact with the upper and lower inner surfaces of the exterior enclosure 2 and extends in the frontward/backward direction from a position on the air-flow-in side or a position in front of the discharge fan 623 to a position on the left side of the control section 4, as shown in FIGS. 1 and 3. That is, the back end of the first partitioning member 81 is separate from the backside inner surface of the exterior enclosure 2, and the discharge fan 623 is disposed between the backside inner surface and the back end of the first partitioning member 81.

The first partitioning member 81 has a connection opening 81h formed in a portion thereof in the vicinity of the aggregation substrate 72, as shown in FIG. 3. The connection opening 81h is a hole through which the wiring section 721 is inserted and is so sized that the wiring section 721 can be managed to be inserted. The connection opening 81h is not limited to a hole and may instead be a U-shaped cutout or a cutout having any other shape. When the connection opening 81h is formed of a cutout, the wiring section 721 can be inserted through the connection opening 81h even after the control section 4 and the aggregation substrate 72 are connected to each other via the wiring section 721 or even when the connection opening 81h is not large enough for the connector to be inserted therethrough. Further, a cushion material or any other material may be provided between the wiring section 721 and the connection opening 81h. The thus provided cushion material can further suppress fluidity of the air flowing between the first region 100 and the second region 200.

The second partitioning member 82 is formed as follows: Part of the second partitioning member 82 overlaps with a front end portion of the first partitioning member 81; upper and front end portions of the second partitioning member 82 are bent; the second partitioning member 82 extends in the upward/downward direction in such a way that it is substantially in contact with the upper and lower inner surfaces of the exterior enclosure 2; and a front end of the second partitioning member 82 is in contact with the left side of the second intake port 22 on the front inner surface of the exterior enclosure 2, as shown in FIG. 3.

A description will now be made of an air flow produced when the cooling apparatus 6 is operated.

An air flow produced when the first cooling apparatus 61 is operated will first be described.

The first cooling apparatus 61 takes in the air outside the exterior enclosure 2 into the first region 100 and cools the members disposed in the first region 100 with the taken-in air.

Specifically, the intake fans 611 take in the air outside the exterior enclosure 2 through the first intake port 21 and cause the taken-in air to flow through the first region 100, as shown in FIG. 1. When the air is taken in through the first intake port 21 into the first region 100, dust present in the outside air is captured by the dust filter 21p, which prevents the dust from entering the first region 100. The air taken into the first region 100 is guided by a duct member that is not shown to the optical apparatus 34, the polarization conversion element 323, and other components and cools these members.

The lamp fans 612 deliver air present on the air-flow-in side of the lamp fans 612 toward the light source apparatus 31 and cool the light source 311 and other members.

The power supply fan 613 delivers air present on the air-flow-in side of the power supply fan 613 toward the light source drive section 53 and cools the circuit devices and other members in the light source drive section 53.

The discharge fans 614 discharge the air having flowed through the first region 100, having cooled the optical apparatus 34, the polarization conversion element 323, the light source 311, the light source drive section 53, and other components, and hence having been heated through the first discharge port 23.

An air flow produced when the second cooling apparatus 62 is operated will then be described.

The second cooling apparatus 62 takes the air outside the exterior enclosure 2 into the second region 200 and cools the members disposed in the second region 200 with the taken-in air.

Specifically, the intake fan 621 takes in the air outside the exterior enclosure 2 through the second intake port 22 and causes the taken-in air to flow through the second region 200, as shown in FIG. 1. The air taken into the second region 200 is delivered to the control section 4, the filter section 51, and the power supply section 52 and cools these members.

The power supply fan 622 delivers air on the air-flow-in side of the power supply fan 622 to the power supply section 52 and cools the power supply section 52.

The discharge fan 623 discharges the air having flowed through the second region 200, having cooled the control section 4, the filter section 51, and the power supply section 52, and hence having been heated through the second discharge port 24. Further, part of the discharge fan 623, specifically, the portion thereof that overlaps with the first region 100 sucks air in the vicinity of the light source drive section 53 and discharges the sucked air through the second discharge port 24.

Since the intake fan 621 is so disposed that it delivers air in the direction along the control substrate 41 and the interface substrate, the air delivered by the intake fan 621 passes by the control section 4 with satisfactory fluidity. Further, in the direction in which the air flows through the second region 200, since the power supply circuit substrate is disposed in the direction in which the intake fan 621 delivers air, the air also passes by the power supply section 52, which is located in a position downstream of the control section 4, with satisfactory fluidity.

As described above, the cooling apparatus 6 cools the members disposed in the first region 100 and the second region 200, into which the partitioning section 8 partitions the interior of the exterior enclosure 2. The air having cooled the members disposed in the first region 100 and the air having cooled the members disposed in the second region 200 are discharged in the same direction (backward) through the first discharge port 23 and the second discharge port 24 provided in the back surface 2B of the exterior enclosure 2. Each of the fans is driven with a drive voltage changed based on an instruction from the control section 4 in accordance with a result of detection performed by a temperature detection section that is not shown.

As described above, according to the present embodiment, the following advantageous effects can be provided.

(1) The interior of the exterior enclosure 2 is partitioned by the partitioning section 8 into the first region 100, where the optical unit 3 is disposed, and the second region 200, where the control section 4 is disposed. Since the connection opening 81h formed in the partitioning section 8 is so sized that the wiring section 721 can be managed to be inserted into the connection opening 81h, the air flow between the first region 100 and the second region 200 can be suppressed. The suppressed amount of air flow achieves improvement in anti-dust performance of the first region 100 and efficient cooling thereof as well as reduction in anti-dust performance of the second region 200 as compared with that of the first region 100 for increased ventilation performance. The following items are therefore possible: prevention of adhesion of dust to the optical parts in the optical unit 3 disposed in the first region 100 and efficient cooling of the optical parts; and efficient cooling of the control section 4, the filter section 51, and the power supply section 52 disposed in the second region 200. The projector 1 can therefore project an image with suppression of image quality degradation due to dust adhering to the optical parts and high temperature thereof and achieve noise reduction, for example, by low-voltage operation of the fans.

(2) Since the intake fans 611 are disposed in the first region 100 and the intake fan 621 is disposed in the second region 200, the amounts and speeds of the air caused to flow through the first region 100 and the second region 200 can be readily controlled.

(3) The control section 4 and the power supply section 52 are arranged side by side in this order in the direction in which the air flows through the second region 200, and the air flowing through the second region 200 cools the control section 4 and then cools the power supply section 52, which is heated to a temperature higher than the temperature of the control section 4. The projector 1 provided by the present embodiment therefore has a reduced size in the rightward/leftward direction, which intersects the frontward/backward direction in which the control section 4 and the power supply section 52 are arranged side by side, and allows the power supply section 52 to be cooled by effectively using the air having cooled the control section 4.

(4) Since the first region 100 and the second region 200 are arranged side by side in the direction that intersects the vertical direction in the installation attitude of the projector 1, heat transfer from one side to the other side is more unlikely to occur than in a configuration in which the two regions are arranged side by side in the upward/downward direction. The optical unit 3, the control section 4, and the power supply apparatus 5 can therefore be efficiently cooled.

(5) The interface section 42 is disposed in the second region 200. Therefore, even when outside dust enters the second region 200 through the terminal opening of the exterior enclosure 2, the partitioning section 8 prevents the dust from entering the first region 100. Dust is therefore more unlikely to adhere to the optical parts in the optical unit 3 disposed in the first region 100.

(6) Since the intake fan 621 is so disposed that it delivers air in the direction along the control substrate 41 and the interface substrate, the cooling air can be caused to flow through the second region 200 with increased fluidity therein, whereby the members disposed in the second region 200 can be efficiently cooled.

(7) Since the air having cooled the members disposed in the first region 100 and the air having cooled the members disposed in the second region 200 are discharged in the same direction, occurrence of multidirectional flow of the discharged air is suppressed. As a result, the projector 1 allows a viewer who feels discomfort due to the discharged air to be present in a wider area in the vicinity of the projector 1 than in a configuration in which the air having cooled the interior of the projector 1 is discharged in a plurality of directions, whereby the projector 1 provided by the present embodiment allows the viewer to more flexibly select the observation position.

Further, since the first discharge port 23 and the second discharge port 24 can be so formed that they are unlikely to be visible from multiple positions outside the projector 1, whereby the exterior appearance of the projector 1 can be improved.

The embodiment described above can be changed as follows.

Variation 1

In the embodiment described above, the wiring section 721 is formed of cables. The wiring section may instead be formed of a circuit substrate, and the thus formed wiring section may be integrated with the control substrate 41 and the aggregation substrate 72.

Figure 4A:
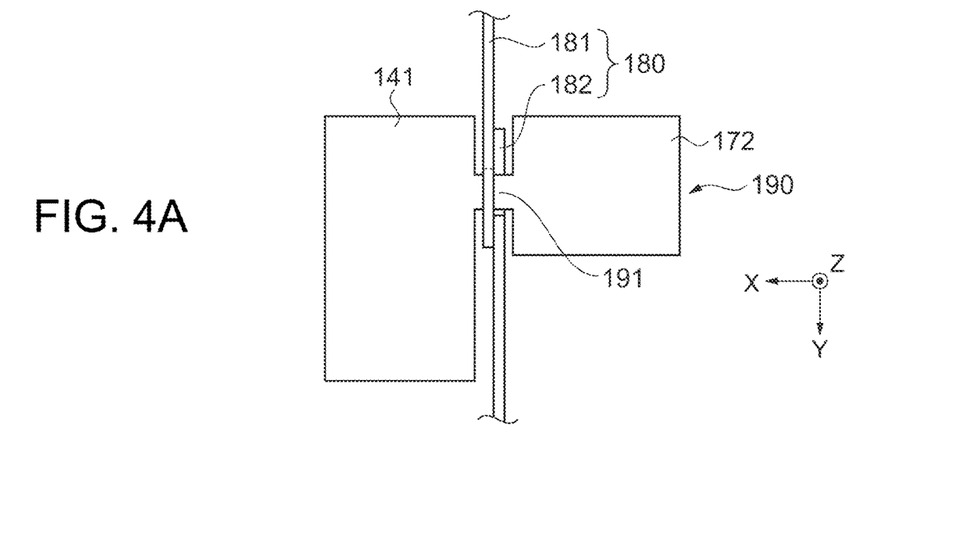
FIGS. 4A and 4B are diagrammatic views for describing the configuration of Variation 1.
Figure 4B:
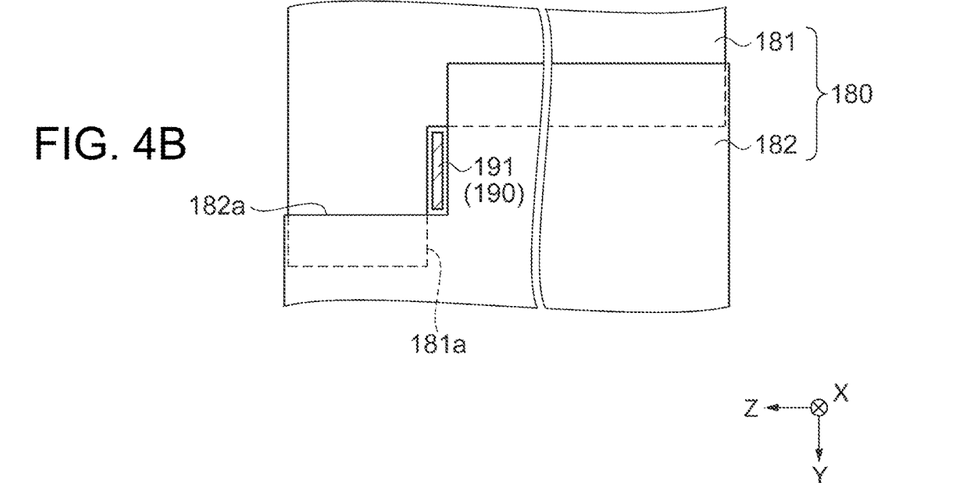

FIGS. 4A and 4B are diagrammatic views for describing the configuration of Variation 1. FIG. 4A shows a circuit substrate 190, which has a wiring section 191, and a partitioning section 180 viewed from above, and FIG. 4B shows the wiring section 191 and the partitioning section 180 viewed from left.

As shown in FIGS. 4A and 4B, the circuit substrate 190 includes a control substrate 141 and an aggregation substrate 172, which are formed in the same manner as the control substrate 41 and the aggregation substrate 72 in the embodiment described above, as well as the wiring section 191, and the wiring section 191 is so integrated with the control substrate 141 and the aggregation substrate 172 that the wiring section 191 serves as a bridge that links the control substrate 141 and the aggregation substrate 172 to each other.

The wiring section 191 has a wiring line formed therein, and the wiring line electrically connects the control substrate 141 and the aggregation substrate 172 to each other. The wiring section 191 is thus formed of part of the circuit substrate integrated with the control substrate 141 and the aggregation substrate 172.

The partitioning section 180 includes a first partitioning member 181 and a second partitioning member 182, part of which overlaps with a front end portion of the first partitioning member 181, as shown in FIGS. 4A and 4B. The first partitioning member 181 has a cutout 181*a* formed in a lower portion of the front end portion thereof, and the second partitioning member 182 has a cutout 182*a* formed in an upper portion of a back end portion thereof, as shown in FIG. 4B. The cutouts 181*a* and 182*a* are so formed that the wiring section 191 is disposed in a gap created between the cutouts, as shown in FIG. 4B. The control section having the control substrate 141 integrated with the aggregation substrate 172 is assembled with the partitioning section 180 in the order of the second partitioning member 182, the control section, and the first partitioning member 181.

According to the configuration described above, no cable, connector, or other components for electrically connecting the control substrate 141 and the aggregation substrate 172 to each other are required, whereby the number of parts can be reduced and the manufacturing procedure can be simplified.

Variation 2

The aggregation substrate 72 only needs to be so configured that it aggregates at least the wiring lines from the light modulator among the components controlled by the control section 4 and disposed in the first region 100. The control section 4 may control not only the fans but also the temperature detection section, a mechanism that adjusts zooming and focusing of the projection lens 35, a motor that drives a lens shift mechanism, and other components, and the aggregation substrate 72 may aggregate wiring lines from the components described above.

Variation 3

In the embodiment described above, the light source drive section 53 is disposed in the first region 100, and the power supply section 52 is disposed in the second region 200. The power supply section 52 and the light source drive section 53 may instead be disposed in the second region 200. Further, the power supply section 52 and the light source drive section 53 are not necessarily arranged side by side in the X direction and may instead be arranged side by side in the Y or Z direction.

In the embodiment described above, the filter section 51 is disposed in the second region 200. The filter section 51 may instead be disposed in the first region 100.

Variation 4

In the embodiment described above, the partitioning section 8 extends from a position on the air-flow-in-side or a position in front of the discharge fan 623 and further forward, and the discharge fan 623 is so disposed that it overlaps with the first region 100 and the second region 200. Instead, the back end of the partitioning section 8 may substantially be in contact with the inner surface of the exterior enclosure 2, and the discharge fan 623 may be disposed in the second region 200.

Variation 5

In the embodiment described above, the first region 100 and the second region 200 are arranged side by side in the rightward/leftward direction. The first region 100 and the second region 200 may instead be arranged side by side in the frontward/backward direction.

Variation 6

The first relay substrates 711R, 711G, and 711B in the embodiment described above are separately provided in correspondence with the liquid crystal panels 341 for the color light fluxes. The first relay substrates may instead be integrated with each other.

Further, the liquid crystal panels 341, the intake fans 611, the lamp fans 612, the power supply fan 613, and the discharge fans 614 and 623 are connected to the aggregation substrate 72 via the relay substrates 71. Instead, a configuration in which no relay substrate 71 is provided and the components described above are directly connected to the aggregation substrate 72 may be employed.

Variation 7

The projector 1 according to the embodiment described above includes one light source apparatus 31. The projector 1 may instead include a plurality of light source apparatus 31. Further, the light source apparatus 31 does not necessarily use a discharge-type lamp and may instead be formed of a lamp based on any other light emission method or a light emitting diode, a laser, or any other solid-state light source.

Further, the optical unit 3 in the embodiment described above is so configured that the direction in which the light source 311 emits light and the direction in which the projection lens 35 projects an image are identical to each other. Instead, the direction in which the light source 311 emits light and the direction in which the projection lens 35 projects an image may intersect each other.

Variation 8

The projector 1 according to the embodiment described above uses transmissive liquid crystal panels 341 as the light modulator. The projector 1 may instead use reflective liquid crystal panels. A micromirror-type light modulator, such as a DMD (digital micromirror device), may still instead be used as the light modulator.

The light modulator in the embodiment described above is operated based on what is called a three-panel method using three light modulation devices corresponding to the R light, G light, and B light. The light modulator is not necessarily operated based on the three-panel method and may instead be operated based on a single-panel method, or the invention is also applicable to a projector including two light modulation devices or four or more light modulation devices.

The present application claim priority from Japanese Patent Application No. 2014-214257 filed on Oct. 21, 2014, which is hereby incorporated by reference in its entirety.

What is claimed is:

1. A projector comprising:
an optical unit including a light modulator that modulates light emitted from a light source and a projection lens that projects light modulated by the light modulator;
a control section that controls action of the projector;
an exterior enclosure that accommodates the optical unit and the control section;
a partitioning section that partitions the interior of the exterior enclosure into a first region where the optical unit is disposed and a second region where the control section is disposed;
a fan that takes air outside the exterior enclosure into the interior thereof and causes the taken-in air to flow through the first region and the second region;
an aggregation substrate disposed in the first region and having a wiring line that originates from at least the light modulator among components that are controlled by the control section and disposed in the first region and is electrically connected to the control section; and
a wiring section that electrically connects the control section and the aggregation substrate to each other.

2. The projector according to claim 1,
wherein the fan includes
a first fan that is disposed in the first region and causes air to flow through the first region, and
a second fan that is disposed in the second region and causes air to flow through the second region, and
the aggregation substrate has a wiring line originating from the first fan and electrically connected to the control section.

3. The projector according to claim 1,
further comprising a power supply apparatus that supplies the control section and the light source with electric power,
wherein the power supply apparatus includes
a filter section that removes noise in externally supplied AC current,
a power supply section that converts AC electric power outputted from the filter section into DC electric power, and
a light source drive section that transforms the DC electric power outputted from the power supply section to drive the light source, and
at least the power supply section in the power supply apparatus is disposed in the second region.

4. The projector according to claim 3,
wherein the power supply section is disposed in a position downstream of the control section in a direction in which the air flows through the second region.

5. The projector according to claim 1,
wherein the control section has a control substrate on which a control circuit device is implemented, and
the wiring section has a wiring line that electrically connects the control substrate to the aggregation substrate and is part of a circuit substrate formed of the control substrate and the aggregation substrate integrated with each other.

6. The projector according to claim 1,
wherein the partitioning section partitions the interior of the exterior enclosure in such a way that the first region and the second region are arranged side by side in a direction that intersects a vertical direction in an installation attitude of the projector.

7. The projector according to claim 1,
wherein the control section includes an interface substrate on which a connection terminal to which an external apparatus is connected is implemented, and
a terminal opening that exposes the connection terminal is formed in the exterior enclosure.

8. The projector according to claim 7,
wherein the interface substrate is so disposed that a surface facing away from the surface on which the connection terminal is implemented faces a lateral side of the projection lens, and
the fan that causes air to flow through the second region is so disposed that the fan delivers the air in a direction along the interface substrate.

9. The projector according to claim 1,
wherein the exterior enclosure has a discharge port through which the air having flowed through the first region and the air having flowed through the second region are discharged in the same direction.

* * * * *